United States Patent [19]

Minamibayashi et al.

[11] 4,264,932
[45] Apr. 28, 1981

[54] PICTURE SIGNAL RECEIVER FOR FACSIMILE AND THE LIKE

[76] Inventors: Seisaku Minamibayashi; Takashi Ishikawa, both of c/o Nippon Electric Co., Ltd., 33-1, Shiba Gochome, Minato-ku, Tokyo, Japan

[21] Appl. No.: 35,019

[22] Filed: May 1, 1979

[30] Foreign Application Priority Data

May 9, 1978 [JP] Japan .................................. 53/55214

[51] Int. Cl.³ .............................................. H04N 1/40
[52] U.S. Cl. .................................... 358/280; 358/283; 358/298
[58] Field of Search ................ 358/256, 298, 280, 283

[56] References Cited

U.S. PATENT DOCUMENTS

| | | | |
|---|---|---|---|
| 3,882,270 | 5/1975 | Ogawa | 358/200 |
| 4,071,849 | 1/1978 | Koyano | 358/298 |
| 4,081,843 | 3/1978 | Okano | 358/280 |

*Primary Examiner*—Howard W. Britton

[57] ABSTRACT

A plurality of analog memory devices alternately store successive one-line segments of facsimile signals. During the write-in period of one memory, the signals of one-line segments are stored while the immediately preceding one-line segment is read out of the other memory and processed to make an amplitude comparison for each picture element. The amplitude comparison is translated into a width of an output pulse for each picture element, which width also reflects the time duration of the facsimile recording paper. Thus, a picture is reproduced with a gradation of shade values.

14 Claims, 9 Drawing Figures

PICTURE SIGNAL RECEIVER FOR FACSIMILE AND THE LIKE

The present invention relates to a picture signal receiver/reproducer for facsimile and the like and, more particularly, to a picture signal receiver which is capable of reproducing a picture having a gradation of shade values.

The gradation of shade values of a picture is usually represented by varying the amplitudes of a picture signal. The same is true with the facsimile transmission, where the picture signal is provided by optically scanning a picture line by line. The scanned areas reflect light rays of varying intensity to enable photodetectors to provide the picture signal of varying amplitudes.

In conventional picture reproducing and/or recording techniques for facsimile and the like, the varying amplitudes have been the only information used for the reproduction of the shade value gradation. However, the development of various types of recording paper has made it possible to employ other approaches. A typical example is the thermal sensitive paper on which the shade of the reproduced picture element depends more linearly on the time duration of a constant-amplitude signal segment. Based on this graded-shade-value-reproducing property of the recording medium, a description has been made in the Japanese Patent Disclosure Nos. 51-123510 and 51-123511 of how to control the total amount of time during which a constant-amplitude signal voltage is applied to the recording element. A similar description is seen in a paper (in Japanese) entitled "An Experiment on the Reproduction of the Shade Value Gradation" by Y. Sekimoto et al. published in the Proceedings of the 36the Conference of the Institute of Visual Image and Electronics, Vol. 77-05 (December 1977), pages 1 to 6.

To state more specifically, in the described system, the incoming analog picture signal is converted first into a 3-bit parallel binary signal. (The A-D conversion may be dispensed with if the incoming signal is a digitized video signal supplied from a magnetic tape storage or the like). Then, the 3-bit signal is stored in a buffer memory having three one-line memories arranged in parallel to receive the three respective parallel bits representing each sample of the picture signal, with eight quantization levels. Thus, the buffer memory is adapted to store a one-line segment of the picture signal in the three-bit parallel binary form. The stored binary signal for one-line segment is cyclically read out ten times, while the thermal sensitive paper is held undriven. For each readout, a logic circuit is set to allow a specific amplitude component to pass therethrough to the recording head. The control of the specific amplitude value rom zero to the seventh quantization levels enables the logic circuit to serve as an amplitude-to-pulse-number converter, which gives an output onto the thermal sensitive paper, recreating the varying shade values of the original picture elements.

During the ten-time readout, the immediately following one-line segment of the incoming picture signal is stored in another buffer memory, that may be arranged in parallel with the above-mentioned one, to enable the above-mentioned ten-time readout therefor. The alternate storing of the one-line segments of the incoming picture signal in the two parallel buffer memories enables the continuous processing of the successive one-line segments of the incoming picture signal.

As will be seen in the description given above, the described system makes it possible to precisely control the total time duration of the recording head activation for each picture element, by controlling the number of unit time lengths during which the constant-amplitude pulse is applied to the recording head, thereby reproducing pictures having degradation of shading values.

However, the described system, requiring an analog to digital converter and a considerable number of high-speed memory and logic elements, is very costly to manufacture, in addition to being complicated.

It is therefore an object of the present invention to provide a simplified receiver/reproducer for a facsimile signal and the like, which does not require expensive high speed memory and logic elements and consequently is less costly to manufacture than the conventional system.

According to the present invention, use is made of such an anlog memory device as a charge coupled device (CCD) and a bucket brigade device (BBD) for the one-line memory. A pair of such one-line analog memory device are arranged in parallel to store the successive one-line segments of the signal alternately. During the write-in period for a one-line segment, the immediately preceding one-line segment is subjected to an amplitude comparison for each picture element. The comparison reference voltage is changed, corresponding to the shade value vs. time duration characteristics of the recording paper. Thus, the amplitude comparison translates the amplitude information of the memory readout into the width of the comparison output pulse for each picture element defined by the pitch of the CCD or BBD elements. The comparison reference voltage is supplied in common to all the amplitude comparators, which are equal in number to the number of picture elements in one scanning line. The parallel output pulses from the parallel amplitude comparators have various pulse widths which are representative of the amplitudes of respective picture elements. Thus, a picture having gradation of shade values is reproduced.

The invention will now be described in conjunction with the accompanying drawings, in which:

FIG. 6b is a timing chart for describing the circuit of FIG. 6a.

Figure 1A:
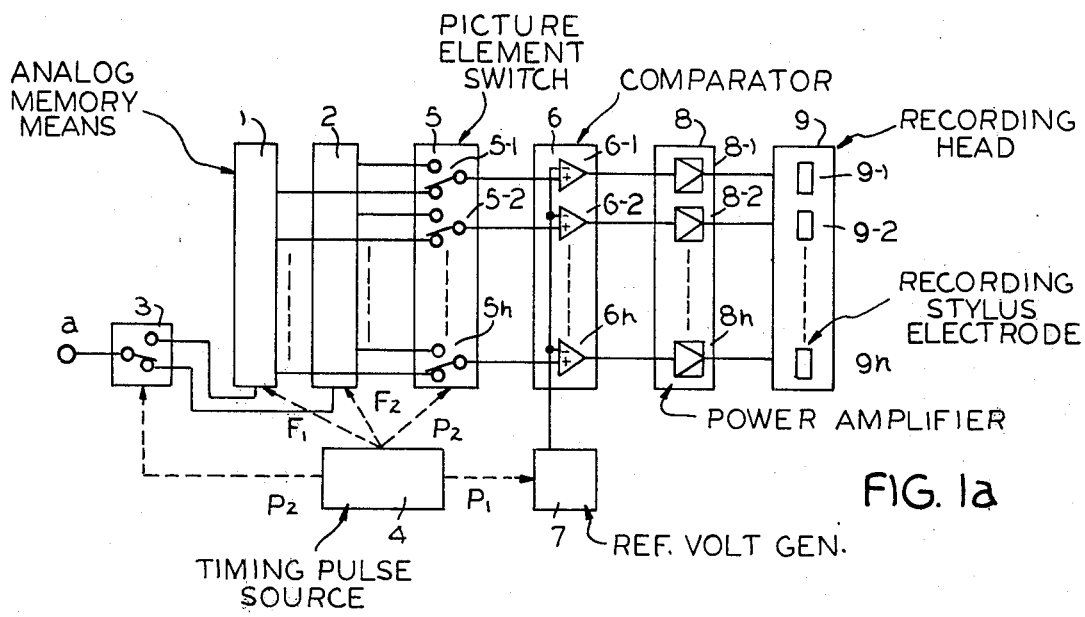
FIG. 1a is a block diagram of an embodiment of the picture signal receiver of the present invention.

The embodiment shown in FIG. 1a has a pair of analog memory devices each made of either a CCD or a BBD. An incoming picture signal, at terminal a, is applied alternately through a line switch 3 controlled by a timing pulse $P_2$, which is supplied from a timing pulse source 4. Each of the analog memory devices 1 and 2, supplied with shift pulses $F_1$ and $F_2$, respectively, has an equal number of memory elements, which respectively define picture elements.

The memory elements of the memory device 1 are connected to one of the two fixed contacts of the respective picture element switch means 5-1, 5-2, . . . and 5-n these switch means together constituting a picture element switch 5. Similarly, the memory elements of the device 2 are connected to the other of the two fixed contacts of the respective switch means 5-1, 5-2, . . . and 5-2 of the switch 5. Under the control of a timing pulse $P_2$, supplied from pulse source 4 and in timed relationship with the line switch 3, the switch 5 alternately applies the respective picture element outputs from memory devices 1 and 2 to the non-inverted input terminal of the respective comparator means 6-1, 6-2, . . . and 6-3, constituting a comparator 6. To the inverted input terminals of these comparator means 6-1, 6-2, . . . and 6-3 is supplied a comparison reference voltage from a reference voltage generator 7, which is controlled by a timing pulse $P_1$ supplied from the pulse source 4. The outputs of the comparator means 6-1, 6-2, . . . and 6-3 are amplified respectively at power amplifier means 8-1, 8-2, . . . and 8-n, having outputs which are supplied to stylus electrodes 9-1, 9-2, . . . and 9-n, of a recording head. A thermal sensitive paper is transported past these stylus electrodes for reproducing and recording the picture received.

Figure 1B:
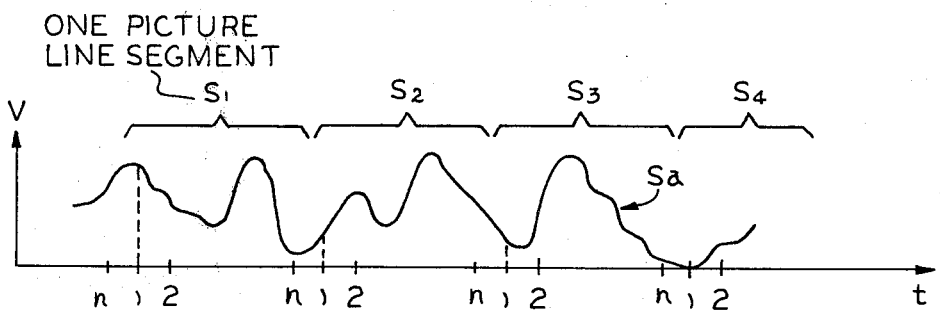
FIG. 1b is a timing chart of picture signals.
Figure 5A:
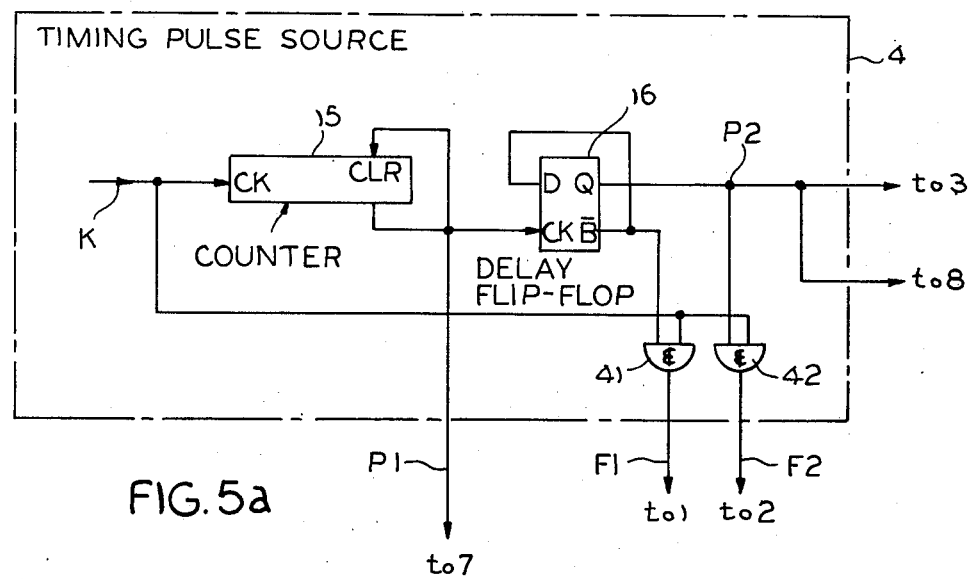
FIG. 5a is a block diagram of a timing pulse source employed in the embodiment.
Figure 5B:
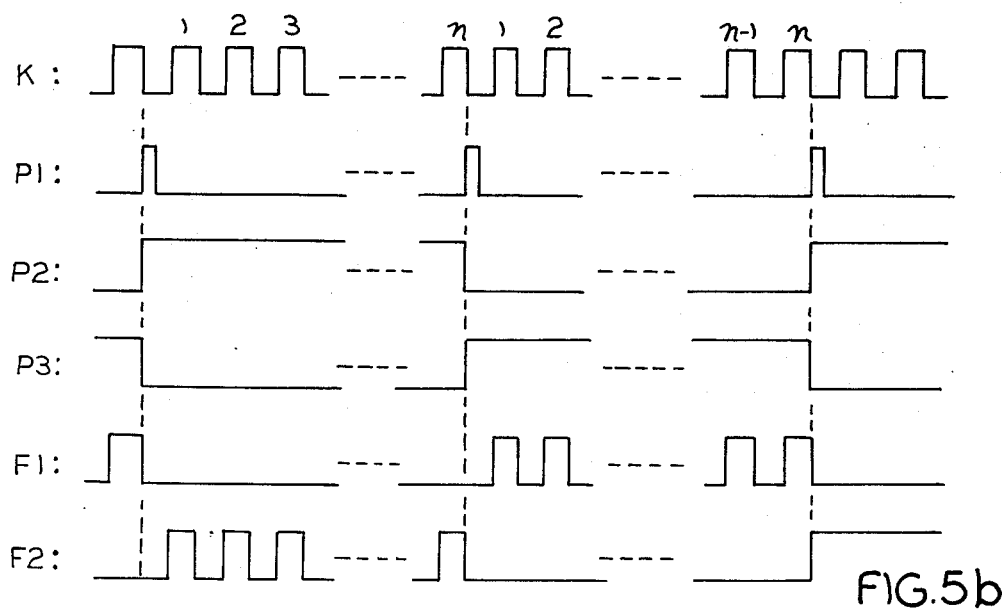
FIG. 5b is a timing chart for describing the timing pulse source.

The timing pulse source 4 (FIG. 5a) has a source (not shown) of clock pulses K (FIG. 5B). The clock pulses K are counted down at a counter 15 to provide the timing pulse $P_1$, which is supplied to the reference voltage generator 7. The countdown output $P_1$ is further supplied to a D-type flip-flop circuit 16. This circuit provides mutually complementary timing pulses $P_2$ (supplied to switches 3 and 5) and $P_3$ at Q and Q output terminals. The pulses $P_2$ are supplied to switches 3 and 5 (FIG. 1). Also, pulses $P_2$ and $P_3$ are supplied to AND gates 41 and 42. This enables the clock pulses K to pass therethrough in response to pulses $P_3$ and $P_2$, respectively, thereby providing shift pulses $F_1$ and $F_2$, to be supplied to memory devices 1 and 2 (FIG. 1).

It will be seen in FIG. 5b that the memory devices 1 and 2 are adapted to temporarily store successive one-line segments of incoming picture signal alternately, so that a one-line segment stored in the memory device 1 may be processed while the immediately following one-line segment is being stored in the memory device 2, and vice versa.

More specifically, in FIG. 16, the first one-line segment $S_1$ of the picture signal $S_a$ is stored in the 1st, 2nd, . . . and n-th memory elements of the memory device 1. While the stored segment $S_1$ is being processed, the next segment $S_2$ is stored in the memory device 2 in a similar manner. Then, during the processing of the segment $S_2$, the next segment $S_3$ is stored in the memory device 1. The same alternate write-in and read-out operation is repeated to achieve the continuous reproduction of the signal.

Figure 2:
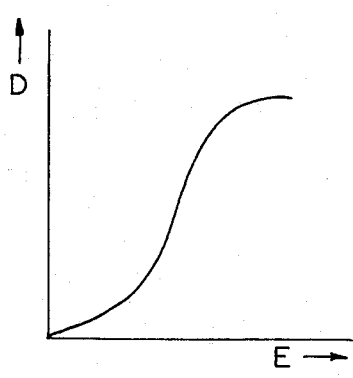
FIG. 2 shows a coloring degree vs. signal energy characteristic curve of a thermal sensitive pager.

The ordinate in FIG. 2 represents the coloring degree of the thermal sensitive paper and the abscissa represents the integrated amount of energy supplied to the paper through the recording head. The characteristic curve indicates that it has a considerable linear portion, where the shade value of the reproduced picture can be controlled in response to the amount of energy applied, i.e., to the signal amplitude or the duration of the signal voltage application. The present invention relies on the control of the time duration for the shade value control while the recording head input signal amplitude is kept constant.

Figure 3:
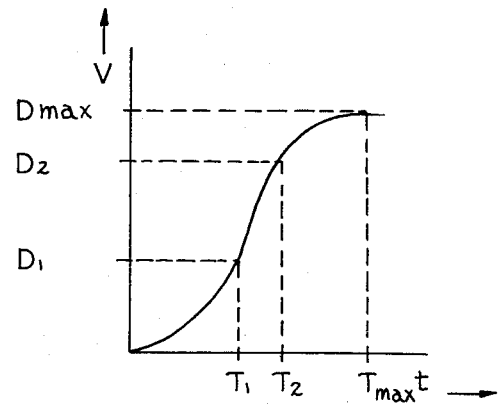
FIG. 3 is a similar characteristic curve for describing the function of the present invention.

To state it more definitely, FIG. 3 indicates that a picture element of an intermediate shade value $D_1$ is reproduced by applying a recording head input for a duration $T_1$. Similarly, another picture element of a little greater shade value $D_2$ is reproduced by applying the recording head input for a duration $T_2$. The greatest shade value $D_{max}$ is likewise reproduced by the duration $T_{max}$.

To achieve the duration control for the recording head input in response to the stored signal amplitudes of each elementary picture, the inverted input terminals of comparator means 6-1, 6-2, . . . and 6-n are supplied with a common comparison reference voltage from the generator 7. The voltage is approximated in waveform to the characteristic curve of FIG. 3 and is repeatedly provided in response to the timing pulse $P_1$, i.e., once for every line-scanning period.

Figure 6A:
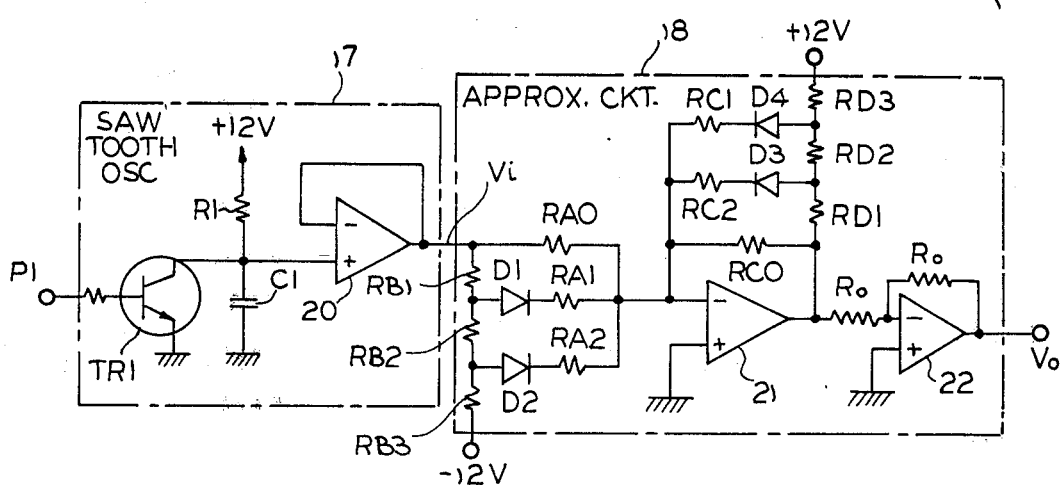
FIG. 6a is a comparison reference voltage generator for use in the embodiment.

In FIG. 6a, the reference voltage generator 7 comprises a saw tooth oscillation circuit 17 and an approximation circuit 18. The timing pulse $P_1$ turns on a transistor $TR_1$ to allow a capacitor $C_1$ to discharge. Capacitor $C_1$ is then quickly recharged through a registor $R_1$, causing high impedance operational amplifier 20 to gradually build a voltage at point Vi. The transistor $TR_1$ then turns on again, in response to the immediately following pulse $P_1$, and thus gives the voltage $V_i$ a substantially saw-tooth shaped waveform.

The voltage $V_i$ is supplied to the approximation circuit 18, which has two operational amplifiers 21 and 22. To the inverted input terminal of the amplifier 21 is connected a resistor $R_{AO}$ through which the voltage $V_i$ is applied. The resistor $R_{AO}$ is shunted by a series connection of resistor $R_{B1}$, diode $D_1$ and resistor $R_{A1}$, while the series connection of the diode $D_1$ and resistor $R_{A1}$ is shunted by another series connection of resistor $R_{B2}$, diode $D_2$ and resistor $R_{A2}$. The junction of resistor $R_{B2}$ and diode $D_2$ is connected through resistor $R_{B3}$ to a negative biasing voltage source. Similarly, the output terminal and the inverted input terminal of the operational amplifier 21 one interconnected by a feedback circuit having: a resistor $R_{CO}$; a serial connection of resistor $R_{C2}$, diode $D_3$, and resistor $R_{D1}$ shunting the resistor $R_{CO}$; a serial connection of resistor $R_{C1}$, diode $D_4$ and resistor $R_{D2}$ shunting the serial connection of resistor $R_{C2}$ and diode $D_3$ serially connected; and resistor $R_{D3}$ connected to a positive biasing voltage source. Also, the non-inverted input terminal of operational amplifier 21 is grounded. The network including resistors $R_{AO}$ to $R_{A2}$, $R_{B1}$ to $R_{B2}$, and diodes $D_1$ and $D_2$ constitutes an input circuit for amplifier 21. The network including the resistors $R_{CO}$ to $R_{C2}$, $R_{D1}$ to $R_{D2}$ and diodes $D_3$ and $D_4$ constitutes a feedback circuit therefor. Assuming that the reference characters for the above-mentioned resistors stand also for the respective resistance values, the resistances are set to satisfy:

$R_{Bi} << R_{Aj}$ $R_{Di} << R_{Cj}$ where i is 1, 2 or 3, while j is 1 or 2.

Figure 6B:
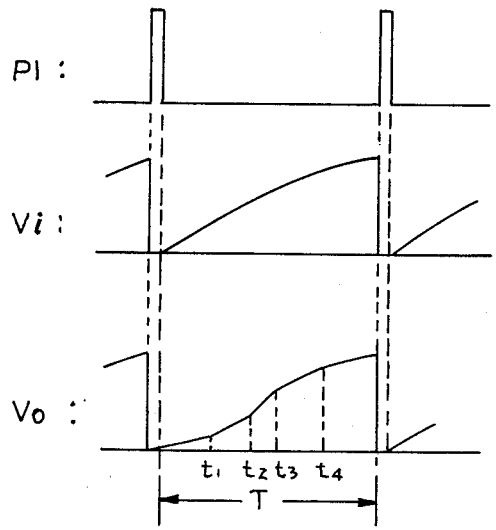

The above-mentioned relationship between the resistance values causes, when the voltage $V_i$ is applied, a diode $D_1$ to turn on at time point $t_1$; diode $D_2$ at $t_2$; diode $D_3$ at $t_3$; and diode $D_4$ at $t_4$. Therefore, the output voltage $V_0$ at the output of the operational amplifier 22, which is provided for giving polarity inversion, has time gradients which are changed at time points $t_1$, $t_2$, $t_3$, and $t_4$ as shown in FIG. 6b. It will be noted that the voltage $V_0$ shows an excellent approximation to the characteristic curve of FIG. 3.

As will be seen in the description given above, the present invention makes it possible to simplify the facsimile receiver capable of the reproduction of shade value gradation. Even if the incoming signal is a two-level signal rather than a multilevel analogue signal, the reproduced picture is given a slight gradation of shade values at picture edges. This makes the reproduced picture more comfortable to look at. However, a two-level facsimile signal is vulnerable to an incorrect discrimination between low and high levels. If such incorrect discrimination occurs at picture edges, the reproduced picture contains "jitters", which make the picture indefinite.

Figure 4:
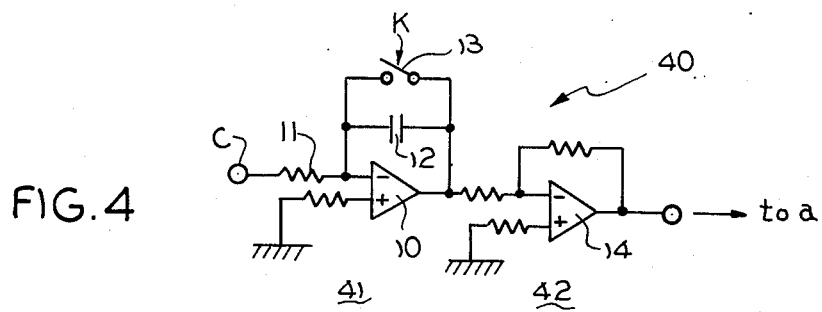
FIG. 4 is an integrating circuit used in a modification of the embodiment.

To overcome such a problem, the incoming picture signal may be time-integrated, on a picture element by picture element basis, before being applied to the analog memory devices 1 and 2. FIG. 4 shows a circuit diagram of integrating circuit 40, which is useful for this purpose.

In FIG. 4, the circuit 40 has an integrating circuit 41 and polarity inverter 42 connected in tandem. The circuit 41 is an ordinary integrating circuit having an operational amplifier 10 and a resistor 11 and a capacitor 12 connected thereto, with the picture signal incoming at terminal C. The capacitor 12 is shunted by a high speed switch element which is turned on in response to the clock pulse K, at every blanking period between one-line segments of the picture signal. By turning the switch off and on, there is a time integration of the signal level is provided for every picture element. In this way, the distinction between the high and low levels of the two-level picture signal is clarified for every picture element. In other words, the signal to noise ratio of the picture signal is markedly improved. The output of the integrating circuit 41 is polarity inverted at the inverter 41 and applied to terminal a of FIG. 1.

The integrating circuit 40 may be employed not only when the incoming picture signal is a two-level signal but also when it is an ordinary multi-level analog signal of low signal to noise ratio.

It should be noted that the concept of the present invention is applicable to other recording media, such as electrostatic and electrolytic recording papers. It will also be apparent that the polarity of the reference voltage can be inverted with the input connection at the voltage comparators 6-1, 6-2, . . . , and 6-n reversed. Furthermore, there may be more than two analog memory devices, with the switches 3 and 5 modified accordingly.

What is claimed is:

1. A receiver/reproducer for facsimile signals and the like, said signals comprising a succession of one-line segments which are separated from each other by blanking periods, said receiver/reproducer comprising:
   at least two analog memory means, each having a predetermined number of memory elements for storing said one-line segment, said memory elements defining picture elements of a picture to be reproduced in response to said facsimile signals;
   means for alternately distributing said signals to said memory means on a segment-by-segment basis and in a predetermined order;
   reading means coupled to the respective memory elements of each of said memory means for reading out the contents of those memory means while signals are not being supplied thereto;
   means for generating, in timed relationship with said one-line segments and said blanking period, a reference signal having a waveform repetition corresponding to the recording characteristics of a recording medium on which said signal is to be reproduced;
   means for controlling the timing of the operating of said memory means, distributing means, reading means and reference signal generating means;
   means for comparing the output of each of said reading means with said reference signals, to provide for each of said picture elements a pulse output which has a width representing the signal level of said output of said reading means with respect to said reference signal;
   means for amplifying said pulse output;
   means responsive to the output of said amplifier means for forming a visual record on said recording medium; and
   means for transporting said recording medium as said amplifier output is supplied to said visual record-forming means.

2. A receiver/reproducer as claimed in claim 1 further comprising means coupled at a stage prior to said analog memory means for time-integrating said picture signal on a picture-element-by-picture-element basis.

3. A facsimile system comprising means for alternately storing analog facsimile signals in separate locations, whereby said analog signals may be stored in either location while other signals are being read out of the other location, means for comparing said readout signals with a reference signal having a characteristic which is representative of a characteristic of a facsimile recording media, means responsive to said comparing means for generating signals which give a shading gradiation, and means responsive to said generated signals for reproducing images with graduated shading on said recording media.

4. The system of claim 3 further comprising means for separating said facsimile signals into a plurality of line-by-line segments, said storing means alternately storing successive ones of said line segments in said separate locations.

5. The system of claim 4 further comprising means for generating timed pulses for controlling the storage and readout of said signals.

6. The system of claim 3 wherein said generated signal are pulses having widths which are controlled according to said comparison by said comparing means.

7. The system of claim 3 wherein said signal storing means is an analog signal-storing means and said signal generating means is a pulse signal-generating means, and means for giving said pulse signal a characteristic which is jointly responsive to the amplitude of said analog signal and the reference voltage representing said recording media.

8. The system of claim 7 wherein said signal-storing means includes a charged coupled device.

9. The system of claim 7 wherein said signal-storing means is a bucket brigade device.

10. The system of claim 7 wherein said characteristic of said recording media is a time duration characteristic of a recording paper.

11. The system of claim 3 further comprising means for separating said facsimile signals into a plurality of line-by-line segments and for separating the signals of each line segment into a plurality of picture element signals, said reference signals having a characteristic representing the time duration of said recording media, said comparing means comparing the picture element signals with said reference signal, and said signal-generating means generating a pulse having a width which varies as a joint function of a picture element signal and said reference signal.

12. The system of claim 11 further comprising means for separating said signals into said picture elements and for operating said pulse-generating means responsive to a train of clock pulses.

13. The system of claim 11 further comprising means for integrating each of said picture element signals over predetermined time periods in order to establish a distinction between high and low levels of signals.

14. The system 13 wherein said picture element signal is an analog signal and said time-integrated signal is a pulse signal.

* * * * *

UNITED STATES PATENT AND TRADEMARK OFFICE
CERTIFICATE OF CORRECTION

PATENT NO. : 4264932
DATED : 4/28/81
INVENTOR(S) : S. MINAMIBAYASHI & T. ISHIKAWA

It is certified that error appears in the above—identified patent and that said Letters Patent is hereby corrected as shown below:

On the title page, Item [73] should read --- Nippon Electric Co., Ltd., Toyko, Japan ---.

*Signed and Sealed this*

*Twentieth* Day of *October 1981*

[SEAL]

*Attest:*

GERALD J. MOSSINGHOFF

*Attesting Officer*    *Commissioner of Patents and Trademarks*

UNITED STATES PATENT AND TRADEMARK OFFICE
CERTIFICATE OF CORRECTION

PATENT NO. : 4,264,932
DATED : April 28, 1981
INVENTOR(S) : S. Minamibayashi and T. Ishikawa It is certified that error appears in the above—identified patent and that said Letters Patent is hereby corrected as shown below:

Col. 3, Line 47, "16" s/b --1b--

Col. 4, Line 40, "one" s/b --are--

Signed and Sealed this

Eighth Day of December 1981

[SEAL]

Attest:

Attesting Officer

GERALD J. MOSSINGHOFF

Commissioner of Patents and Trademarks